United States Patent
Kitabatake et al.

(10) Patent No.: US 9,604,632 B2
(45) Date of Patent: Mar. 28, 2017

(54) CONTROL SYSTEM FOR HYBRID VEHICLE

(75) Inventors: Hirotatsu Kitabatake, Susono (JP); Yuji Iwase, Mishima (JP); Hideaki Komada, Gotenba (JP); Yosuke Suzuki, Susono (JP); Masafumi Yamamoto, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/412,549

(22) PCT Filed: Jul. 5, 2012

(86) PCT No.: PCT/JP2012/067161
§ 371 (c)(1),
(2), (4) Date: Apr. 24, 2015

(87) PCT Pub. No.: WO2014/006717
PCT Pub. Date: Jan. 9, 2014

(65) Prior Publication Data
US 2015/0217756 A1    Aug. 6, 2015

(51) Int. Cl.
*B60W 20/13*    (2016.01)
*B60K 6/445*    (2007.10)
(Continued)

(52) U.S. Cl.
CPC ........... *B60W 20/106* (2013.01); *B60K 6/445* (2013.01); *B60W 10/06* (2013.01); *B60W 10/08* (2013.01);
(Continued)

(58) Field of Classification Search
CPC ...... B60W 20/106; B60W 20/13; B60K 6/445
See application file for complete search history.

(56) References Cited

U.S. PATENT DOCUMENTS 5,788,006 A    8/1998    Yamaguchi
6,131,538 A    10/2000   Kanai
(Continued)

FOREIGN PATENT DOCUMENTS

CN    101855115 A    10/2010
JP    8 295140       11/1996
(Continued)

OTHER PUBLICATIONS

U.S. Office Action mailed Oct. 21, 2015 in co-pending U.S. Appl. No. 14/412,236.
(Continued)

*Primary Examiner* — Basil T Jos
(74) *Attorney, Agent, or Firm* — Oblon, McClelland, Maier & Neustadt, L.L.P.

(57) ABSTRACT

A vehicle control system is provided to reduce a change in drive force and to start an engine without delay when starting the engine by a motor during running. The control system is applied to a hybrid vehicle having an internal combustion engine and two motors supplied electric power from a battery. The control system comprises a determination means that determines a fact that a state of charge of the battery is lower than a first threshold, during propelling the vehicle by the two motors by supplying the electric power from the battery while stopping the engine (at step S2); and a drive force restriction means that restricts a total drive force of said two motors for propelling the vehicle to an allowable limit which is lower than a theoretical maximum drive force of said two motors, given that the state of charge of the battery is lower than a first threshold (at step S3).

18 Claims, 9 Drawing Sheets

(51) Int. Cl.
  *B60W 20/00* (2016.01)
  *B60W 10/06* (2006.01)
  *B60W 20/40* (2016.01)
  *B60W 10/26* (2006.01)
  *B60W 10/08* (2006.01)

(52) U.S. Cl.
  CPC ............ *B60W 10/26* (2013.01); *B60W 20/13* (2016.01); *B60W 20/40* (2013.01); *B60W 2510/244* (2013.01); *B60W 2710/08* (2013.01); *B60W 2710/105* (2013.01); *Y02T 10/6239* (2013.01); *Y10S 903/93* (2013.01)

(56) References Cited

U.S. PATENT DOCUMENTS

| | | |
|---|---|---|
| 2009/0082171 A1 | 3/2009 | Conlon et al. |
| 2009/0236160 A1 | 9/2009 | Tanaka et al. |
| 2010/0179714 A1 | 7/2010 | Tani et al. |
| 2010/0222953 A1* | 9/2010 | Tang ................... B60L 15/2036 701/22 |
| 2011/0040435 A1 | 2/2011 | Gillecriosd |
| 2012/0083951 A1 | 4/2012 | Yang et al. |
| 2012/0116629 A1 | 5/2012 | Kamoshida |
| 2013/0035845 A1 | 2/2013 | Takara |
| 2013/0091694 A1 | 4/2013 | Hussain et al. |
| 2013/0311028 A1* | 11/2013 | Ohkuma ................ B60W 10/06 701/22 |
| 2014/0358340 A1 | 12/2014 | Radev |
| 2015/0142232 A1 | 5/2015 | Tabata et al. |
| 2015/0217756 A1 | 8/2015 | Kitabatake et al. |

FOREIGN PATENT DOCUMENTS

| | | |
|---|---|---|
| JP | 2009 227147 | 10/2009 |
| JP | 2010-269692 A | 12/2010 |
| JP | 2010 280334 | 12/2010 |
| JP | 2011-231667 A | 11/2011 |
| JP | 2012-106712 A | 6/2012 |

OTHER PUBLICATIONS

International Search Report Issued Jul. 31, 2012 in PCT/JP12/067161 Filed Jul. 5, 2012.

Notice of Allowance mailed May 11, 2016 for U.S. Appl. No. 14/412,236.

Corrected Notice of Allowability issued on Jun. 17, 2016 in U.S. Appl. No. 14/439,385.

* cited by examiner

⟨EV Mode⟩

(a)

⟨Starting Eng by MG1⟩

(b)

CONTROL SYSTEM FOR HYBRID VEHICLE

TECHNICAL FIELD

The present invention relates to a control system for a hybrid vehicle comprising a plurality of different power units such as an internal combustion engine and an electric motor.

BACKGROUND ART

A conventional hybrid vehicle is comprised of an internal combustion engine and an electric motor having a generating function, and a power of the engine is distributed to the motor side and an output side connected to drive wheels through a power distribution device as a differential mechanism. The power distribution device is adapted to perform a differential action among rotary members individually connected to the engine, the motor, and an output member. Specifically, the power distribution device distributes power from the engine to the motor side and the output side, and an engine speed is controlled by a reaction force of the motor serving as a generator. In order to convert an electric power generated by the motor into a mechanical power, a second motor is connected to the output member or an output shaft. The hybrid vehicle thus structured is called "two-motor type hybrid vehicle", and in the hybrid vehicle of this kind, the engine and the motor can be operated separately. In the hybrid vehicle, therefore, the drive modes can be selected from engine mode where the vehicle is powered only by the engine, motor mode where the vehicle is powered only by the motor, and hybrid mode where the vehicle is powered by both engine and motor.

For example, US 2009/0082171 A1 describes a hybrid vehicle comprised of an engine and two motors. The hybrid vehicle taught by US 2009/0082171 A1 is provided with a planetary gear set including a ring gear being selectively connectible to the first motor/generator and the engine through a clutch or brake, a sun gear being continuously connected to the second motor/generator, and a carrier member continuously connected to drive wheels through an output member. According to the teachings of US 2009/0082171 A1, the transmission includes clutches and brakes that are selectively engageable alone or in different combinations to connect different ones of the nodes to one another or to a stationary member, thereby establishing the various operating modes. Specifically, the operation mode is shifted among the two motor electric-only mode where both motor/generators are operated, the one motor electric-only mode where only the second motor/generator is operated, and the output split mode where the engine and the second motor/generator are operated.

Another example of the hybrid vehicle is described in Japanese Patent Laid-Open No. 08-295140. According to the teachings of Japanese Patent Laid-Open No. 08-295140, a planetary gear unit serves as the power distribution device in which a carrier is connected to an engine, a sun gear is connected to a generator/motor, and a torque of an electric motor is added to a torque of a ring gear. To this end, both the engine and the carrier are stopped by the brake. The power distribution device is used as a speed reducer by stopping the carrier by the brake when the vehicle is powered by the generator/motor while stopping the engine.

In order to reduce fuel consumption, in the hybrid vehicle, the engine is operated in an optimally fuel efficient manner while regenerating energy. To this end, an EV mode is established by supplying power to the motor under a condition where a state of charge of a battery is sufficient and an accelerator is not opened widely. In this situation, the engine is stopped to reduce the fuel consumption while being disconnected from a powertrain to the drive wheels thereby reducing power loss resulting from rotating the engine passively.

If the state of charge of the battery connected to the motor becomes low during the EV mode, the engine has to be restarted to ensure the drive force and to charge the battery. In addition, the engine is also needed to be started when an accelerator pedal is depressed deeply to generate a large drive force. In those cases, a motoring torque for cranking the engine is generated by the motor serving as a power source. As described, according to the teachings of the foregoing prior art documents, both motor/generators are used as motors under the EV mode, and any one of the motor/generators is used to crank the engine. However, if one of the motor/generators is immediately switched to crank the engine upon satisfaction of restarting condition of the engine due to low battery condition under the EV mode where both motor/generators serve as motors, total drive force drops immediately to the drive force established by the other motor/generator. As a result of such sudden reduction in the drive force, shocks would be caused unintentionally. In addition, in order to immediately switch one of the motor/generators to crank the engine upon satisfaction of restarting condition while generating the drive force by the other motor/generator, a complex control is required and a control delay would be caused when restarting the engine.

DISCLOSURE OF THE INVENTION

The present invention has been conceived noting the foregoing technical problems, and it is therefore an object of the present invention is to provide a control system for a hybrid vehicle that is configured to reduce a change in drive force and to start an engine without delay when starting the engine by a motor during running.

The control system of the present invention is applied to a hybrid vehicle having an internal combustion engine and two motors to which electric power is supplied from a battery, that is configured to select a drive mode from a mode where the vehicle is powered by the engine, and a mode where the vehicle is powered by at least one of the motors while stopping the engine. The control system is characterized by: a determination means that determines a fact that a state of charge of the battery is lower than a first threshold, during propelling the vehicle by the two motors by supplying the electric power from the battery while stopping the engine; and a drive force restriction means that restricts a total drive force of said two motors for propelling the vehicle to an allowable limit which is lower than a theoretical maximum drive force of said two motors, given that the state of charge of the battery is lower than a first threshold.

The drive force restriction means is further configured to alter the allowable limit of the drive force to be lower than a theoretical maximum drive force of one of the motors.

The drive force restriction means is further configured to lower the allowable limit of drive force in accordance with a reduction in the state of charge of the battery.

The first threshold is set to be higher value than a second threshold for determining start-up of the engine, and altered depending on a detection value representing running condition of the vehicle.

The control system is further comprised of a transaxle that holds the motors and delivers the power of the engine toward the drive wheels, and a controller that controls the motors.

The detection value includes at least one of a temperature of the motor, a temperature of the controller, a temperature of the transaxle estimated from the temperatures of the motor and the controller, and a vehicle speed.

The first threshold is increased if any of the temperatures of the motor, the controller, the transaxle estimated from the temperatures of the motor and the controller is high, to be higher than that of a case in which any of those temperatures is low.

The first threshold is increased with an increment of the vehicle speed to be higher than that of a case in which the vehicle speed is low.

The drive force restriction means is configured to lower the allowable limit of drive force with an increment of the vehicle speed to be lower than that of a case in which the vehicle is low.

The drive force restriction means is configured to lower the allowable limit of drive force if any of the temperatures of the motor, the controller, the transaxle estimated from the temperatures of the motor and the controller is high, to be higher than that of a case in which any of those temperatures is low.

Thus, according to the present invention, the drive force restricting means restricts the total drive force of two motors to the allowable limit in case the determining means determines that the state of charge of the battery is lower than the first threshold under the condition that the vehicle is powered by two motors while deactivating the engine. Therefore, the drive force will not fall short even when starting the engine. In addition, under the two-motor mode, although the drive forces of the two motors are restricted, the vehicle is still allowed to be propelled within the allowable limit of drive force. Therefore, those two motors can be operated in an electrically efficient manner to propel the vehicle. Further, the state of the charge of the battery will not falls below a threshold value for determining to start the engine so that the battery can be prevented from being damaged.

The drive force restriction means is configured to restrict the drive force of the two motors to be lower than the maximum drive force of any one of the motors. Therefore, the drive force will not fall short temporarily even if starting the engine by the other motor during propelling the vehicle by the two motors so that shocks and uncomfortable feeling can be reduced.

As described, the allowable limit of drive force can be altered in accordance with a running condition such a change in the state of charge of the battery. Therefore, the allowable limit of drive force can be prevented from being lowered more than necessary so that the drive force for achieving the drive demand can be ensured irrespective of the running condition.

As also described, the first threshold for determining to start the engine is set to be higher value than the second threshold, and the drive forces of the two motors are restricted to the allowable limit based on a comparison between the first threshold and the state of charge. Therefore, the drive forces of the two motors can be restricted to the allowable limit in anticipation of starting of the engine. That is, the vehicle is propelled by the drive forces of the two motors thus restricted upon satisfaction of starting condition of the engine but one of the motors still can generate the drive force larger than the restricted value so that the engine can be started by the other motor without causing shortage of drive force. Additionally, the first threshold can be altered in accordance with the detection values representing the running condition of the vehicle. Therefore, the engine can be started before the state of charge of the battery falls excessively so that the battery can be prevented from being damaged as a result of an over discharging.

The first threshold may also be altered based on temperatures of the structural elements. Therefore, the motor, the controller and the transaxle etc. can be prevented from being damaged by an excessive temperature rise thereof.

The threshold of the state of charge of the battery may also be altered based on a vehicle speed and temperatures of the structural elements. Therefore, the state of charge of the battery can be maintained sufficiently to propel the vehicle by altering the allowable limit of the drive force in an appropriate manner based on those parameters.

Specifically, the allowable limit of drive force is lowered within relatively high speed region or high temperature region. Therefore, the engine is still allowed to be started at the high speed or high temperature region by one of the motor without causing a shortage of drive force.

DESCRIPTION OF THE PREFERRED EMBODIMENT(S)

Preferred examples of the control system according to the present invention will now be explained with reference to the accompanying drawings. The control system of the present invention is configured to shift a drive mode between EV (i.e., Electric Vehicle) mode where the hybrid vehicle is powered only by an electric motor and HV (i.e., Hybrid Vehicle) mode where the hybrid vehicle is powered by both electric motor and internal combustion engine. Specifically, the control system of the present invention is configured to start the engine when shifting the drive mode from the EV mode to the HV mode, and to restrict allowable output powers of the motors for propelling the vehicle for the preparation of shifting the drive mode from EV mode to HV mode when the engine is expected to be stared. Thus, the control system of the present invention is applied to a hybrid vehicle comprised of an internal combustion engine and a motor serving as prime movers. In the following explanation, a running state where the vehicle is propelled under the EV mode will be called the "EV running", and a running state where the vehicle is propelled under the HV mode will be called the "HV running". Hereinafter, preferred examples of the present invention will be explained with reference to the accompanying drawings.

Figure 4:
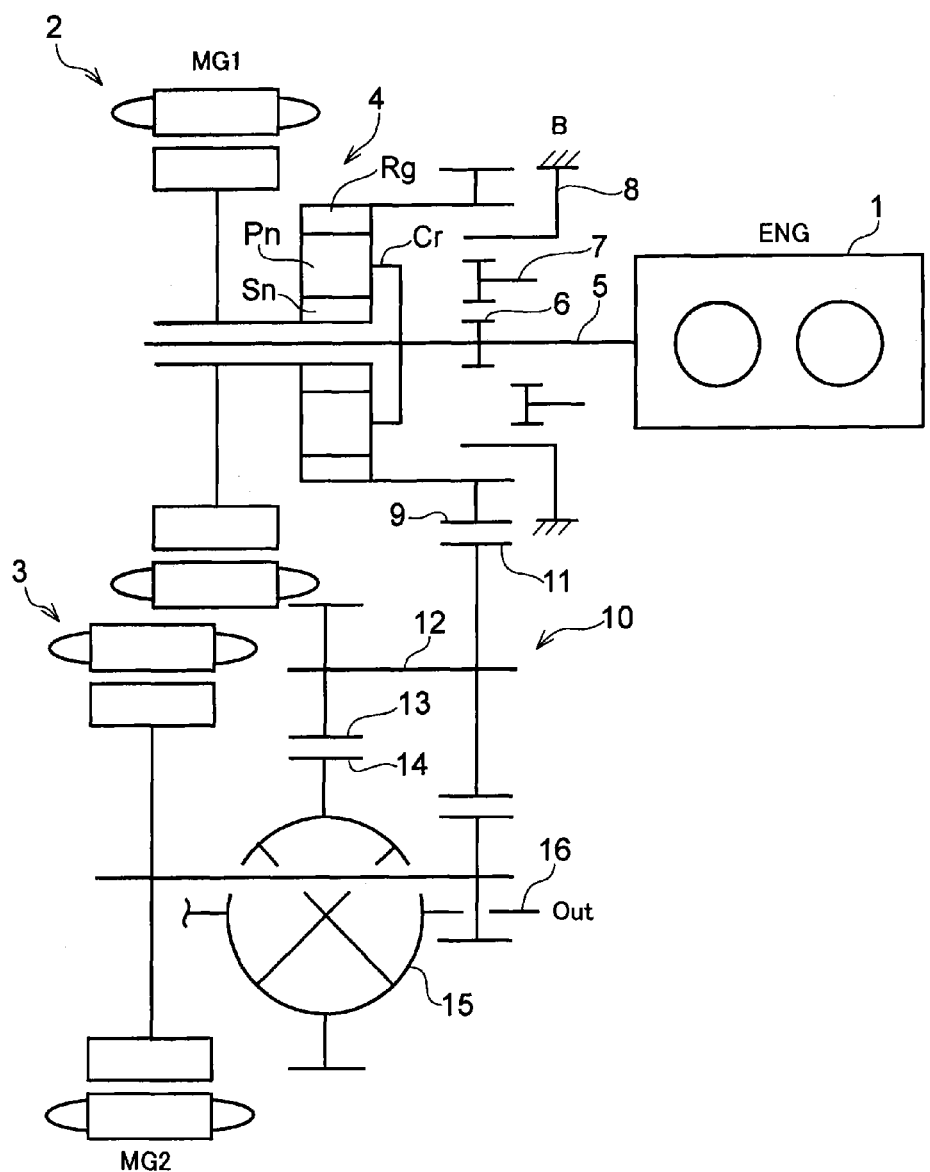
FIG. 4 is a skeleton diagram schematically showing the vehicle to which the control system of the present invention is applied.

First of all, a structure of the hybrid vehicle to which the control system according to the preferred example is applied will be explained hereinafter. Referring now to FIG. 4, there is shown a power transmission route of the hybrid vehicle for transmitting power of the prime mover. The hybrid vehicle shown therein is comprised of different kinds of power units such as an engine 1, a first motor/generator 2, and a second motor/generator 3. Specifically, the engine 1 is an internal combustion engine adapted to generate power by burning fuel such as a gasoline engine and a diesel engine. The first motor/generator 2 and the second motor/generator 3 generate power when electric power is supplied thereto, and generate electric power when rotated compulsory by an external force. Thus, those power units serve as a prime mover of the hybrid vehicle for generating a drive force, and the drive force of the prime mover is delivered to the drive wheels through the power transmission route. It is to be noted that the engine 1, the first motor/generator 2 and the second motor/generator 3 are individually abbreviated as "ENG", "MG1" and "MG2" in the accompanying figures. In addition, although not especially illustrated, the first motor/generator 2 and the second motor/generator 3 are individually connected with a battery to exchange power therebetween.

A power distribution device 4 is disposed on the power transmission route between the engine 1 and the drive wheels to distribute power of the engine 1. According to the example shown in FIG. 4, a single-pinion planetary gear unit having three rotary elements is employed as the power distribution device 4. Specifically, the power distribution device 4 is comprised of a sun gear Sn as an external gear, a ring gear Rg as an internal gear arranged concentrically with the sun gear Sn, pinion gears Pn meshing with the sun gear Sn and the ring gear Rg, and a carrier Cr supporting the pinion gears Pn while allowing to rotate and revolve. The sun gear Sn is connected to the first motor/generator 2, the carrier Cr is connected to the engine 1, and the ring gear Rg is connected to the not shown drive wheels through an output member.

Specifically, a rotary shaft 5 integrated with a crank shaft of the engine 1 is connected to the carrier Cr to be rotated integrally therewith by the power of the engine 1. In order to selectively stop rotation of the rotary shaft 5 and the carrier Cr, a brake B as an engagement element is disposed on the power transmission route between the engine 1 and the power distribution device 4. That is, the brake B is brought into disengagement to enable torque transmission between the engine 1 and the power distribution device 4, and brought into engagement to inhibit torque transmission therebetween.

Any kind of dog clutch, friction clutch etc. adapted to selectively allow and stop rotation of the rotary shaft 5 may be used as the brake B. In the example shown in FIG. 4, specifically, a dog clutch is employed to serve as the brake B. As illustrated in FIG. 4, the brake B is comprised of a hub 6 having a spline on its outer circumferential face and disposed on the rotary shaft 5, and a sleeve 7 splined onto the hub 6 in a manner to be reciprocated axially by a not shown actuator. A spline is also formed on an outer circumferential face of the sleeve 7, and a cylindrical member 8 is splined onto the sleeve 7 while being fixed to a fixing portion such as a casing. Thus, the brake B is adapted to stop rotation of the rotary shaft 5 and the carrier Cr by engaging the hub 6 with the fixing portion through the sleeve 7.

An output gear 9 serving as an output member is connected to the ring gear Rg of the power distribution device 4 to be rotated integrally therewith while being meshed with a counter driven gear 11 fitted onto a counter shaft 12. A counter drive gear 13 is also fitted onto the counter shaft 12 while being meshed with a ring gear 14 of a differential 15. Thus, the counter driven gear 11, counter shaft 12 and the counter drive gear 13 forms a counter gear pair 10, and the output gear 9 is also connected to the differential 15 through the counter gear pair 10. That is, the drive force is delivered to the drive wheels from the differential 15 through an axle shaft 16.

The sun gear Sn of the power distribution device 4 is connected to the first motor/generator 2. Specifically, a rotor of the first motor/generator 2 is integrated with a rotary shaft serving as an output shaft, and the rotary shaft is also connected to the sun gear Sn of the power distribution device 4 to be rotated integrally therewith.

Although not especially illustrated, the hybrid vehicle is provided with a battery storing electric power to be supplied to the motor/generators 2 and 3 and an inverter arranged therebetween. An apparatus such as the battery and the converter for controlling the motor/generators 2 and 3 serves as the controller of the present invention. The electric powers regenerated by the motor/generators 2 and 3 are stored into the battery via the inverter. In addition, the motor/generators 2 and 3 are built in a transaxle.

The hybrid vehicle is further provided with an electronic control unit (to be abbreviated "ECU" hereinafter) that is configured to control the power units and the engagement elements. The ECU is a microcomputer comprised of a processing unit, a memory unit and an input-output interface.

For example, detection signals of speeds of the engine 1 and the motor/generators 2 and 3, a state of charge (to be abbreviated as "SOC" hereinafter) of the battery, a vehicle speed, an acceleration, a depression of an accelerator pedal, a depression of a brake pedal, a rotational speed of the axle shaft 16, a rotational speed of the drive wheel etc. are sent to the ECU. In addition, various kinds of control programs and data are preinstalled in the memory unit of the ECU. Based on those incident signals and the preinstalled data, the ECU sends a command signals to the engine 1, the motor/generators 2 and 3, the brake B and so on.

Further, detection values of the running condition of the vehicle such as a vehicle speed, an SOC, temperatures of the motor/generators 2 and 3, a temperature of the inverter, a temperature of the battery, a temperature of the controller, a drive force, a drive demand, and changes in a vehicle speed, an SOC, a temperature etc. are saved in the memory unit of the ECU. Here, the temperature of the controller may be estimated from the temperature of the battery or the inverter. Optionally, a map used to shift the drive mode may be also preinstalled in the memory unit.

Figure 5:
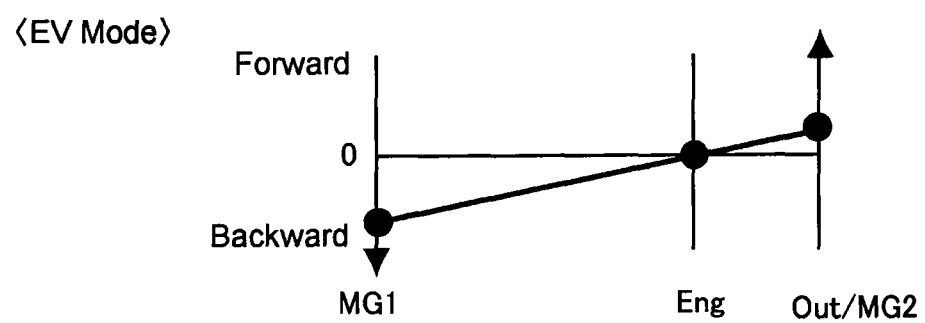
FIG. 5 shows nomographic diagrams of the planetary gear unit as the power distribution device in which (a) shows a situation under the EV mode and (b) shows a situation during starting the engine.
Figure 5:
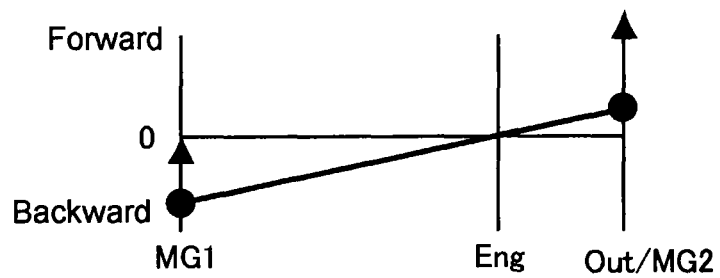

Referring now to FIG. 5, there are shown nomographic diagrams of the planetary gear unit serving as the power distribution device 4. In the nomographic diagrams shown in FIG. 5, the vertical lines represent the rotary elements of the planetary gear unit, and each clearance between those vertical lines is determined depending on a gear ratio between the rotary members. In the nomographic diagram, vertical level on the line represents a rotational speed of the rotary element. Specifically, the nomographic diagram shown in FIG. 5 indicates a relation among the rotary members connected to the engine 1, the first motor/generator 2 and the second motor/generator 3. As described, the single pinion planetary gear unit is used as the power distribution device 4. Accordingly, in the nomographic diagram shown in FIG. 5, the line representing the sun gear Sn connected to the first motor/generator 2 is situated on the left side, the line representing the ring gear Rg connected to the second motor/generator 3 is situated on the right side, and the line representing the carrier Cr that is stopped by the brake B and that is connected to the engine 1 is situated in the middle.

The control system of the present invention is configured to establish at least two kinds of drive modes. For example, the drive mode can be selected from the EV mode where the vehicle is powered by one of the motor/generators 2 and 3 while stopping the engine 1, and the HV mode where the vehicle is powered by both of the engine 1 and the second motor/generator 2. In addition, an engagement state of the brake B as the engagement element is altered depending on the drive mode. Hereinafter, the drive modes will be explained in more detail.

First of all, the EV mode of the hybrid vehicle to be achieved by the control system will be explained in more detail. Under the EV mode, the vehicle is powered by both first and second motor/generators 2 and 3. That is, the vehicle is propelled by the torques of the first motor/generator 2 and the second motor/generator 3 while stopping the engine 1. Specifically, the EV mode is established by bringing the brake B into engagement while rotating the first motor/generator 2 in the backward direction and rotating the second motor/generator 3 in the forward direction. Here, it is to be noted that the definition of the "forward direction" is a same direction as the rotational direction of the engine 1, and the definition of the "backward direction" is an opposite direction to the rotational direction of the engine 1. A nomographic diagram of the EV mode is shown in FIG. 5(a). In this case, torque of the first motor/generator 2 is delivered to the sun gear Sn of the power distribution device 4, and torque of the second motor/generator 3 is delivered to the counter gear pair 10 connected to the ring gear Rg of the power distribution device 4.

Under the situation indicated in FIG. 5(a), a torque amplification in the EV mode may be compared to a principle of leverage. In FIG. 5(a), specifically, the carrier Cr halted by the brake B serves as the pivot point, the sun gear Sn serves as the point of effort, and ring gear Rg serves as the point of load. Provided that a clearance between the lines representing the carrier Cr and the ring gear Rg is "1", a clearance between the lines representing the carrier Cr and the ring gear Rg is determined based on a gear ratio between the sun gear Sn and the ring gear Rg. Accordingly, the rotational speed of the ring gear Rg is increased with a reduction in the rotational speed of the sun gear Sn. That is, the torque applied to increase the rotational speed of the first motor/generator 2 is delivered to the output gear 9 while being multiplied by the power distribution device 4. In other words, a reaction torque of the first motor/generator 2 in the backward direction, that is, downwardly in FIG. 5 (a) is applied to the sun gear Sn so that the torque applied to the output gear 9 is amplified. Thus, under the EV mode, the drive torque can be multiplied at low speed according to demand of the driver especially to start the vehicle.

In turn, the HV mode where the engine 1 is operated to serve as the prime mover will be explained. Under the HV mode, power of the engine 1 is distributed through the power distribution device 4 to rotate the first motor/generator 2 to generate power and to rotate the drive wheels. When the drive mode is shifted from the EV mode to the HV mode, the engine 1 is started by the first motor/generator 2. A nomographic diagram of the HV mode is shown in FIG. 5(b). In this case, the torque of the first motor/generator 2 is used to control the rotational speed of the engine 1, and the torque of second motor/generator 3 serving as the motor is also delivered to the drive wheels. The HV mode is selected when the SOC is low or the vehicle speed is high. Under the HV mode, specifically, the vehicle is powered mainly by the engine 1, and the power of the engine 1 is partially converted into an electric power on the way to the drive wheels. Specifically, under the HV mode, the engine 1 is activated while bringing the brake B into disengagement. In this case, the power of the engine 1 is delivered to the power distribution device 4, and further distributed to the first motor/generator 2 side and to the drive wheel side through the output gear 9. Under the HV mode, therefore, the first motor/generator 2 is rotated by the power of the engine 1 to serve as a generator, and an electric power generated by the first motor/generator 2 is delivered to the second motor/generator 3 to operate as a motor.

Here will be explained a torque amplification in the HV mode with reference to the nomographic diagram. When the torque of the first motor/generator 2 is applied to the sun gear Sn in the direction opposite to the rotational direction of the torque acting on the carrier Cr, torque of the engine 1 is applied to the ring gear Rg while being multiplied. Consequently, the first motor/generator 2 serves as a generator while applying a reaction torque to the sun gear Sn, and resultant electric power is used to rotate the second motor/generator 3 in the forward direction as a motor. As a result, the torque of the engine 1 is partially delivered from the carrier Cr to the ring gear Rg, and the remaining torque is once converted into electric energy and outputted from the counter gear pair 10 while being converted into mechanical torque again. Under the HV mode, therefore, the engine speed can be controlled arbitrarily by the first motor/generator 2 in a fuel efficient manner so that fuel economy of the vehicle can be improved. As described, the engine 1 is stopped under the EV mode and operated under the HV mode. That is, in case of shifting the drive mode from the EV mode to the HV mode, the engine 1 has to be started during the shifting operation. According to the preferred example, therefore, the drive mode is basically shifted responsive to changes in the SOC.

Figure 2:
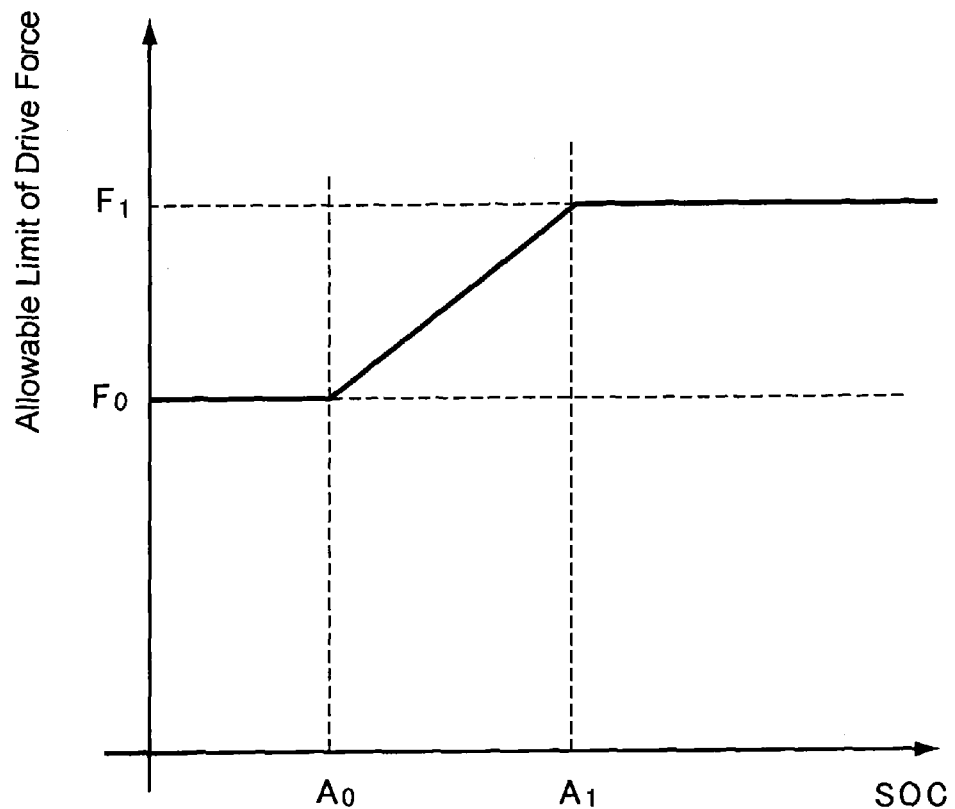
FIG. 2 shows a change in an allowable limit of drive force limited in accordance with the SOC.

Here will be explained a threshold used for the shifting operation between the HV mode and the EV mode. According to the preferred example, a first threshold and a second threshold are employed. Specifically, the first threshold is a criterion for determining start-up of the engine 1 to shift the drive mode from the EV mode to the HV mode. On the other hand, the second threshold is a criterion for predicting start-up of the engine 1 and to restrict a drive force to the allowable limit. Specifically, as shown in FIG. 2, a reference value $A_0$ as the first threshold and a reference value $A_1$ as the second threshold are used as a criterion of the SOC. That is, the threshold is the criterion used in the control for shifting the drive mode from the HV mode to the EV mode. Here, as will be explained later, the first threshold can be altered depending on a driving condition of the vehicle. The above-mentioned allowable limit is an upper limit value of the drive force for propelling the vehicle to be generated by the first and the second motor/generators 2 and 3. That is, a total drive force generated by the first and the second motor/generators 2 and 3 is restricted to the allowable limit so that the vehicle is propelled by the drive forces of those motor/generators 2 and 3 thus restricted.

As described, FIG. 2 shows an example for changing the allowable limit of the drive force in accordance with a change in the SOC. In FIG. 2, $F_1$ is a total theoretical maximum drive force of the motor/generators 2 and 3, and $F_0$ is a theoretical maximum drive force of the second motor/generator 3. Specifically, the allowable limit is elevated to the maximum drive force $F_1$ of the motor/generators 2 and 3 under the condition that the SOC is higher than the reference value $A_1$, and when the SOC falls below the reference value $A_1$, the allowable limit is decreased gradually toward the maximum drive force $F_0$ in proportion to a reduction in the SOC. Then, when the SOC falls below the reference value $A_0$, the allowable limit is lowered to the maximum drive force $F_0$ of the second motor/generator 3. Thus, according to the example shown in FIG. 2, the allowable limit is lowered in accordance with the change in the SOC. Here, the control system for the hybrid vehicle should not be limited to the example shown in FIG. 2. For example, the allowable limit of the drive force may also be reduced to be smaller than the maximum drive force $F_0$ of the second motor/generator 3 before the SOC falls below the reference value $A_0$. Alternatively, the allowable limit of the drive force may also be reduced so that a difference between the allowable limit and the maximum drive force $F_0$ falls within a predetermined value upon reduction in the SOC to the reference value $A_0$. The above-mentioned predetermined value is smaller than the difference between the maximum drive forces $F_1$ and $F_0$ so that a shortage or deficiency of the torque for starting the engine 1 can be reduced. Consequently, shocks can be decreased.

Figure 1:
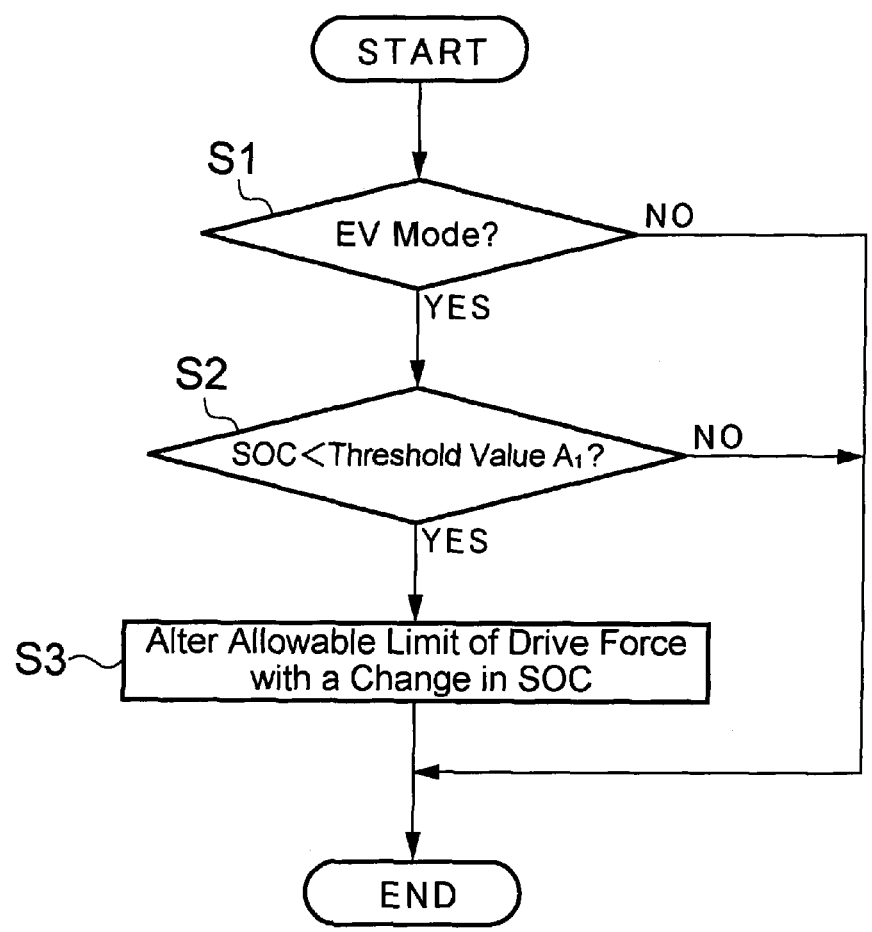
FIG. 1 is a flowchart showing a control example carried out by the control system for a hybrid vehicle according to the present invention.

Next, the control for shifting the drive mode will be explained with reference to FIG. 1. Specifically, FIG. 1 shows a control example for restricting the drive force during propelling the vehicle by the motor/generators 2 and 3 while stopping the engine 1. That is, FIG. 1 shows a control example for altering an upper limit of the drive force prior to starting the engine 1, and the control shown therein is carried out by the ECU. First of all, it is determined whether or not the hybrid vehicle is propelled under the EV mode (at step S1). Specifically, the determination of step S1 can be made based on a mode signal from the ECU with reference to the map defining regions of the drive modes that is preinstalled in the memory unit. If the drive mode is not the EV mode so that the answer of step S1 is NO, the routine is returned without carrying out any specific controls.

By contrast, if the vehicle is propelled under the EV mode so that the answer of step S1 is YES, then it is determined whether or not conditions to restrict the total drive force of the first and second motor/generators 2 and 3. According to the example shown in FIG. 1, specifically, it is determined whether or not the SOC is lower than the threshold value $A_1$ (at step S2). According to the example shown in FIG. 1, an SOC is used as a parameter to determine a satisfaction of the conditions at step S2. However, an optional parameters such as a vehicle speed, temperatures of the motor/generators 2, 3 and an inverter may also be used at step S1. If the SOC is higher than the threshold value $A_1$ so that the answer of step S2 is NO, the routine is returned without carrying out any specific controls.

If the SOC is lower than the threshold value $A_1$ so that the answer of step S2 is YES, the total drive force of the motor/generators 2 and 3 is restricted while altering the allowable limit of the drive force with a change in the SOC (at step S3). Specifically, the total drive force of motor/generators 2 and 3 is restricted to the allowable limit that is lower than the maximum drive force $F_1$, and the allowable limit is altered in accordance with a change in the SOC.

Figure 3:
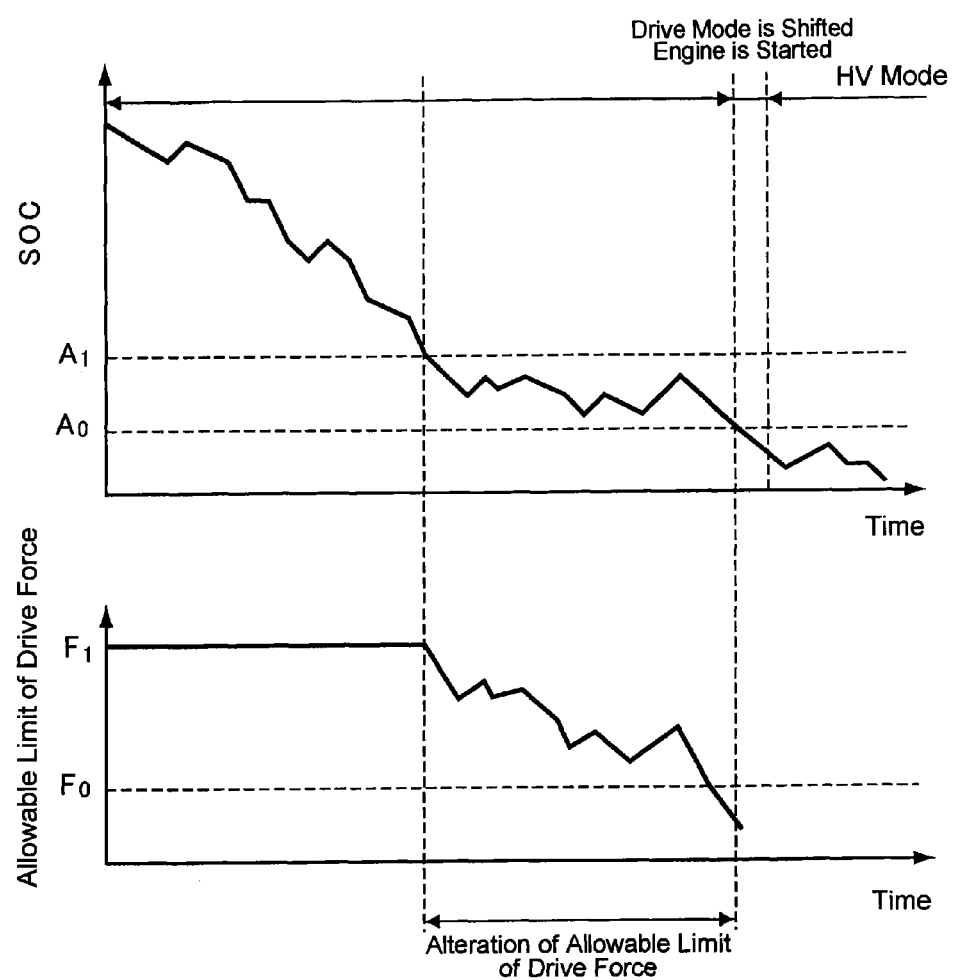
FIG. 3 is a time chart showing changes in the SOC and the allowable limit of drive force.

Thus, as shown in FIG. 3, the allowable limit of the drive force is lowered with a reduction in in the SOC and elevated with an increment of the SOC during restricting the drive force to the allowable limit.

A process of lowering the allowable limit of the drive force depending on the running condition will be explained with reference to FIG. 3. Referring now to FIG. 3, there is shown a time chart indicating the alteration of the allowable limit based on a change in the SOC. Under the EV mode, the SOC of the battery is gradually lowered as a result of supplying the electric power to the first and the second motor/generators 2 and 3. When the SOC is lowered to the reference value $A_1$, the engine 1 is still stopped by stopping fuel supply thereto while being idled, and the allowable limit of the first and the second motor/generators 2 and 3 under operation to generate the drive force is started to be lowered. As described, the first and the second motor/generator 2 and 3 are adapted to generate the maximum drive force $F_1$. In this situation, however, the allowable limit of the first and the second motor/generators 2 and 3 to generate the drive force is lowered so that the drive force possible to be generated by the motor/generators 2 and 3 are restricted to be smaller than the maximum drive force $F_1$ thereof.

Thus, as shown in FIG. 3, the allowable limit of drive force is altered in accordance with a change in the SOC during a period indicated as "alteration of allowable limit". When the SOC is further reduced to be lower than the threshold value $A_0$, the drive mode is shifted from the EV mode to the HV mode. Specifically, the drive mode is shifted to the HV mode by rotating the stopping engine 1 by the torque of the first motor/generator 2 while supplying fuel thereto when a rotational speed of the engine 1 reaches an ignition speed, and controlling the rotational speed of the engine 1 by the first motor/generator 2 afterward. Before the SOC reaches the threshold value $A_0$, the allowable limit of drive force is lowered to a level at which the drive force to be generated by the motor/generators 2 and 3 is smaller than the maximum drive force $F_0$ of the second motor/generator 3 itself. In this situation, even if a torque of the first motor/generator 2 is used to crank the engine 1, the second motor/generator 3 can generate the maximum drive force $F_0$ that is larger than the drive force to be achieved by both motor/generators 2 and 3 the allowable limit thereof is thus lowered. For this reason, the drive force for propelling the vehicle will not fall short temporarily. That is, even if the torque of the first motor/generator 2 is used for other application such as the motoring of the engine 1, a shortage of driving torque will not be caused. As a result, shocks and uncomfortable feeling can be reduced.

In the foregoing examples, the SOC is thus employed as a parameter to shift the drive mode between the EV mode and the HV mode. However, the electric power is also consumed by electric equipment such as an air conditioner, headlights etc., other parameters may also be employed to determine the shifting of the drive mode instead of the SOC. For example, a vehicle speed and a temperature may also be used as the parameter to shift the drive mode instead of the SOC, and according to the below-explained another examples, the allowable limit of the drive force is altered based on a change in the vehicle speed or the temperature in addition to a change in the SOC.

Figure 7:
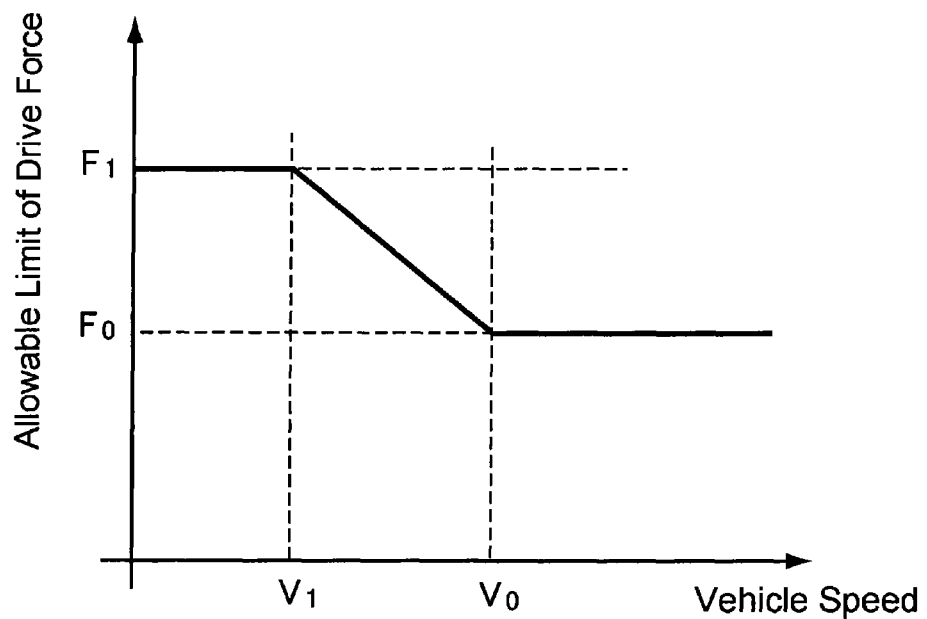
FIG. 7 is a graph indicating a change in the allowable limit of drive force limited in accordance with a vehicle speed.
Figure 8:
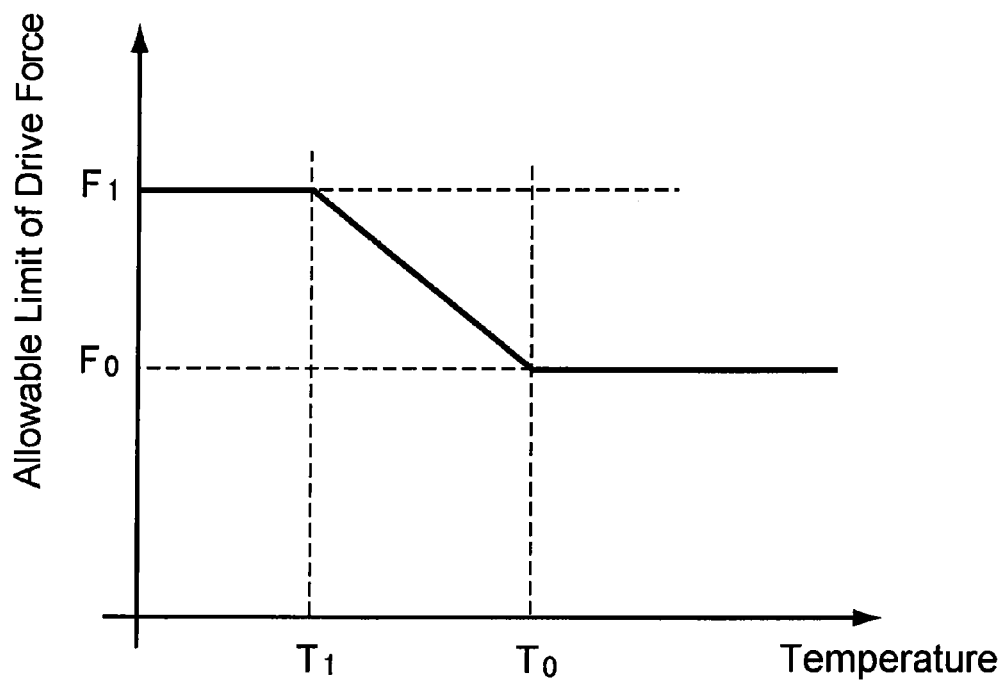
FIG. 8 is a graph indicating a change in the allowable limit of drive force limited in accordance with a temperature.

Control examples using the vehicle speed and the temperature as parameters will be explained with reference to FIGS. 6 to 8. FIG. 7 is a graph showing an example for controlling the allowable limit of drive force in accordance with a vehicle speed, and FIG. 8 is a graph showing an example for controlling the allowable limit of drive force in accordance with a temperature. According to the example shown in FIG. 7, when the vehicle speed exceeds a reference speed $V_1$, the allowable limit of drive force is lowered to restrict the drive force generated by the motor/generators 2 and 3 to be smaller than the maximum drive force $F_1$ thereof, and gradually reduced toward the maximum drive force $F_0$ in reverse proportion to an increment of vehicle speed. Then, the engine 1 is started when the vehicle speed reaches a reference speed $V_0$. According to the example shown in FIG. 8, when the temperature exceeds a reference temperature $T_1$, the allowable limit of drive force is lowered to restrict the drive force generated by the motor/generators 2 and 3 to be smaller than the maximum drive force $F_1$ thereof, and gradually reduced toward the maximum drive force $F_0$ in reverse proportion to an increment of the temperature. Then, the engine 1 is started when the temperature reaches a reference temperature $T_0$. As described, before the vehicle speed reaches the threshold speed $V_0$ or the temperature reaches the threshold temperature $T_0$, the allowable limit of drive force is lowered to restrict the drive force generated by the motor/generators 2 and 3 to be smaller than the maximum drive force $F_0$ of the second motor/generator 3. Thus, the engine 1 can be started based on various parameters such as the vehicle speed and the temperature so that the shortage of drive force can be avoided in various situations while restricting the drive force to the allowable limit. Here, said temperature includes temperatures of the motor/generators 2 and 3, a temperature of the inverter, a temperature of the controller, and a temperature of a transaxle.

Figure 6:
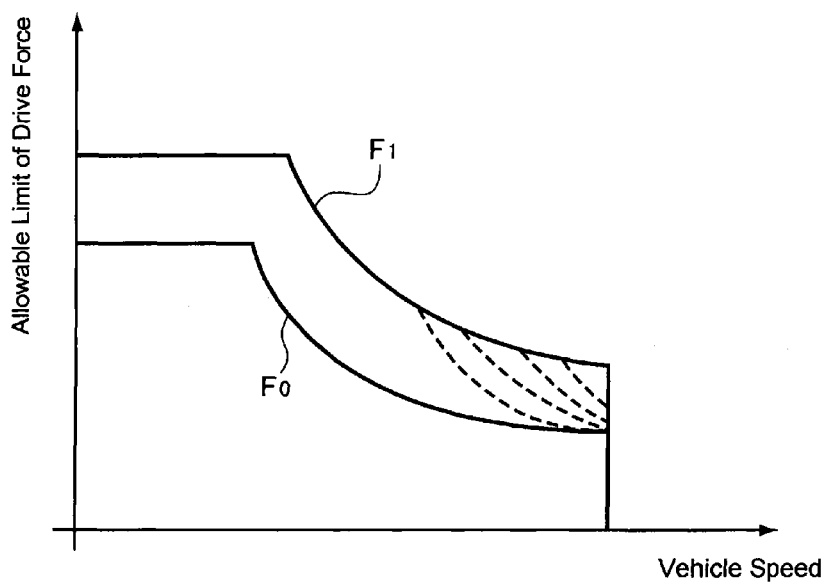
FIG. 6 shows a map for limiting the allowable limit of drive force in accordance with the SOC and a vehicle speed.

FIG. 6 is a graph showing an example of lowering the allowable limit of drive force in accordance with the SOC and a vehicle speed. In FIG. 6, each continuous line individually indicate the allowable limit of the total drive force and the drive force of the second motor/generator 3 restricted in accordance with an increment of vehicle speed, and each dashed line individually indicate the maximum drive force $F_1$ lowered depending on the SOC and the vehicle speed. Specifically, when the SOC is low, the allowable drive force is started to be lowered at a relatively low speed. By contrast, when the SOC is high, the allowable drive force is started to be lowered at a relatively high speed. That is, if the SOC is high, the reference speed $V_1$ is increased to be higher than that of the case in which the SOC is low. Thus, the first reference value is altered with a change in other parameter. Specifically, when the vehicle speed is high, the reference value $A_1$ as the first reference value of the SOC is increased to be higher than that of the case in which the vehicle speed is low. When the temperature is high, the reference value $A_1$ is also increased to be higher than that of the case in which the temperature is low. Consequently, the drive mode for propelling the vehicle using both motor/generators 2 and 3 can be extended under the condition where the SOC is sufficient so that the vehicle can be propelled in an electrically efficient manner for a longer period of time. Additionally, the allowable limit of drive force can be lowered based on running condition of the vehicle, and the engine 1 can be started based on the parameters other than the SOC such as the vehicle speed. Therefore, a temporal shortage of the drive force and resultant shocks can be avoided.

Figure 9:
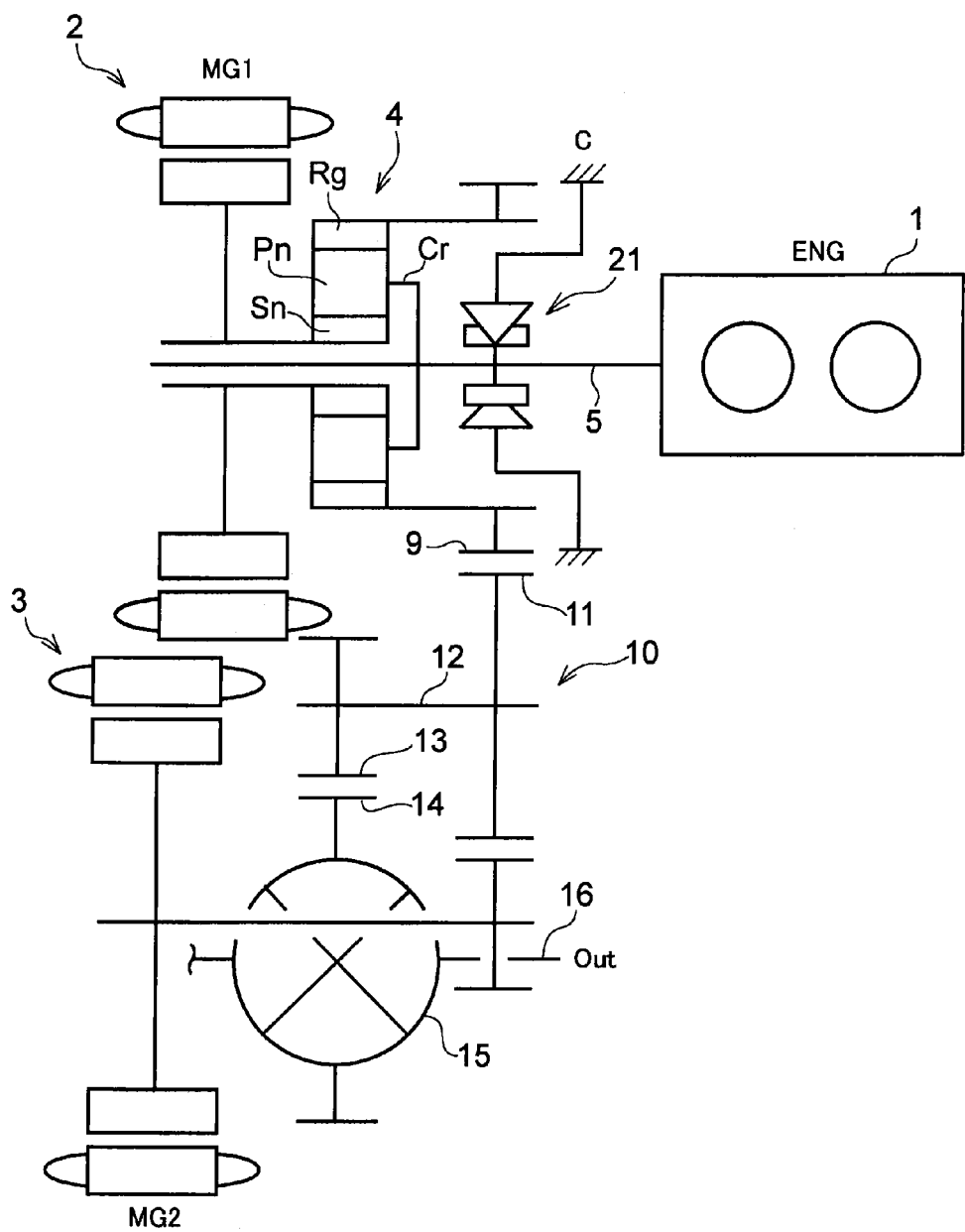
FIG. 9 is a skeleton diagram schematically showing the vehicle to which the control system of another example is applied.

Next, modified examples of structures of the hybrid vehicles to which the control system of the present invention is applied will be explained with reference to FIGS. 9 and 10. Specifically, other kinds of engagement elements are used and other elements of the powertrain are modified in the below-explained modifications. In the following explanation, common reference numerals are allotted to the elements in common with those of the first example, and detailed explanation for those common elements will be omitted. Referring now to FIG. 9, there is shown a skeleton diagram of a hybrid vehicle in which a clutch device is used as the engagement element. For example, in the example shown in FIG. 9, a friction clutch, a one-way clutch etc. may be used as a clutch C instead of the brake B. Specifically, the clutch C is comprised of a one-way clutch 21 adapted to selectively stop rotation of the rotary shaft 5 of the engine 1. As the foregoing example, an actuation of the clutch C is controlled by the above-explained ECU as the case of the brake B, and brought into disengagement during the shifting operation from the EV mode to the HV mode.

Figure 10:
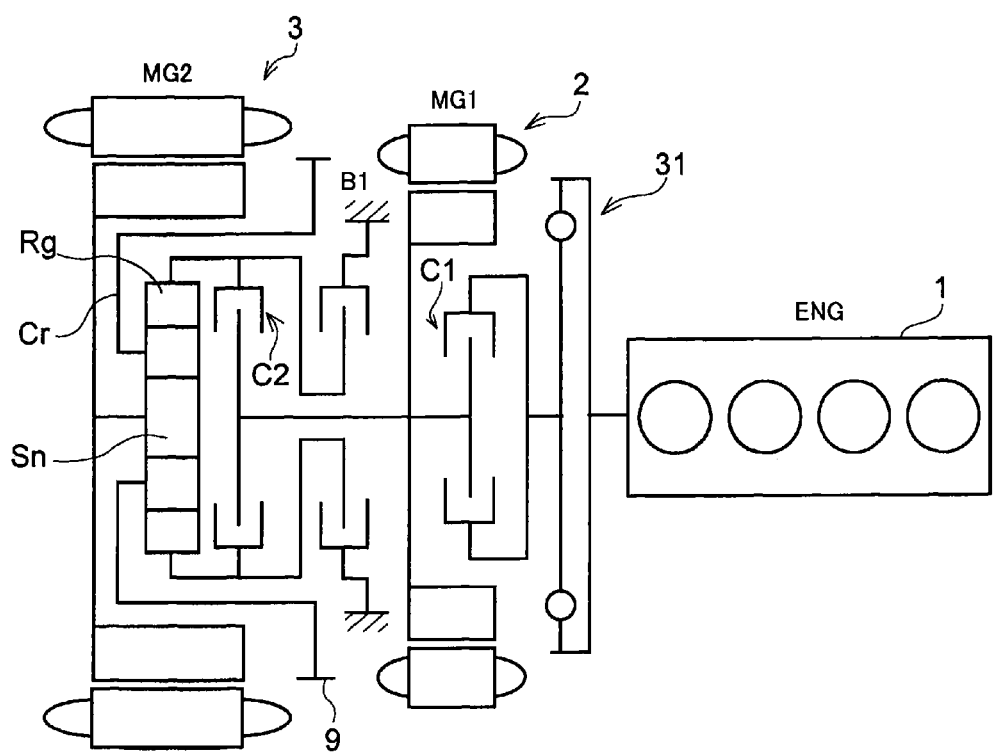
FIG. 10 is a skeleton diagram schematically showing the vehicle to which the control system of still another example is applied.

In turn, FIG. 10 is a skeleton diagram showing an example of a hybrid vehicle in which an arrangement of the rotary members is altered and in which of a plurality of engagement elements are employed to selectively connect the power transmission route. According to the example shown in FIG. 10, the sun gear Sn of the power distribution device 4 is connected to the second motor/generator 3, the ring gear Rg is connected to the engine 1 and the first motor/generator 2, and the carrier Cr is connected to the output gear 9. That is, the engine 1 is connected to the ring gear Rg through clutches C1 and C2, and the first motor/generator 2 is connected to the ring gear Rg through the clutch C2. In addition, a brake B1 is arranged to selectively connect the ring gear Rg to the fixing member such as a housing. That is, a rotation of the ring gear Rg is selectively stopped by the brake B1. Thus, the engine 1 is disconnected form the powertrain by the clutch C1, and a torque converter 31 may be disposed between the engine 1 and the clutch C1.

As the foregoing examples, according to the example shown in FIG. 10, the drive mode can be shifted among a plurality of modes. For example, under the EV mode, the motor/generators 2 and 3 are used as prime movers, and the brake B1 and the clutch C1 are disengaged and the clutch C2 is engaged. In this situation, the drive force can be restricted to the allowable limit based on a comparison result of the parameters such as the SOC, the vehicle speed and the temperature with the second threshold. In addition, the starting condition of the engine 1 is satisfied based on a comparison result of the parameters and the first threshold. When the starting condition of the engine 1 is satisfied, the engine 1 is started by the output torque of the first motor/generator 2 connected to the engine 1 via the clutch C1 in engagement. In this situation, the brake B1 in disengagement is brought into the engagement, the clutch C2 in engagement is brought into disengagement, and the clutch C1 is brought into engagement. Thus, when starting the engine 1, the drive force is restricted to the allowable limit that is a lower than the maximum drive force $F_0$ of the second motor/generator 3. Therefore, the first motor/generator 2 is allowed to be used for cranking the engine 1 in the process of shifting to the HV mode. Further, given that the clutch C1 is in engagement, only the clutch C2 in engagement is required to be disengaged so that the shifting response can be improved. Here, a friction clutch, a dog clutch etc. may be used as the clutches C1 and C2 and the brake B1.

Here will be explained a relation between the foregoing examples and the present invention. The functional means of the ECU for carrying out the control of step S2 in FIG. 1 serve as the determination means of the invention, and the functional means for carrying out the control of step S3 shown in FIGS. 2, 3, and 6 to 8 serve as the drive force restriction means of the invention.

While the control system for hybrid vehicles has been described in reference to the illustrated embodiment, the present invention can be further modified within the spirit of the disclosure.

For example, the EV mode and the HV mode may be split into a plurality of modes. Specifically, the HV mode may be adapted for a low-speed and high-load condition, or for an overdriving condition where the speed ratio is smaller than 1.

In addition to say, while in the foregoing example, a comparison result of the parameters with the thresholds has been expressed as "higher" and "lower", those expressions such as "the vehicle speed is higher than the threshold", "the temperature is higher than the threshold", "the SOC is higher than the threshold" etc. will not literally limit the scope of the invention. Also, definition of the state of charge that has been abbreviated as "SOC" includes not only a remaining electric power in the battery but also other parameters such as a charging rate, an allowable output etc. of the battery.

The invention claimed is:

1. A control system for a hybrid vehicle having an internal combustion engine and two motors to which electric power is supplied from a battery, that is configured to select a drive mode from a mode where the vehicle is powered by the engine, and a mode where the vehicle is powered by at least one of the motors while stopping the engine, comprising:
   determination means that determines whether a state of charge of the battery is lower than a first threshold during propulsion of the vehicle by the two motors by supplying the electric power from the battery while stopping the engine; and
   drive force restriction means that restricts a total drive force of said two motors for propelling the vehicle to an allowable limit which is lower than a theoretical maximum drive force of said two motors when the state of charge of the battery is lower than the first threshold.

2. The control system for a hybrid vehicle as claimed in claim 1, wherein the drive force restriction means alters the allowable limit of the drive force to be lower than a theoretical maximum drive force of one of the motors.

3. The control system for a hybrid vehicle as claimed in claim 1, wherein the drive force restriction means lowers the allowable limit of drive force in accordance with a reduction in the state of charge of the battery.

4. The control system for a hybrid vehicle as claimed in claim 3, wherein the drive force restriction means lowers the allowable limit of drive force, with an increment of vehicle speed, to be lower than that of a case in which the vehicle speed is low.

5. The control system for a hybrid vehicle as claimed in claim 1, wherein the first threshold is set to be higher value than a second threshold for determining start-up of the engine and is altered depending on a detection value representing a running condition of the vehicle.

6. The control system for a hybrid vehicle as claimed in claim 5, further comprising:
   a transaxle that holds the motors and delivers the power of the engine toward drive wheels; and
   a controller that controls the motors,
   wherein the detection value includes at least one of a temperature of the motor, a temperature of the controller, a temperature of the transaxle estimated from the temperatures of the motor and the controller, and a vehicle speed.

7. The control system for a hybrid vehicle as claimed in claim 6, wherein the first threshold is increased, if any of the temperatures of the motor, the controller, the transaxle estimated from the temperatures of the motor and the controller is high, to be higher than that of a case in which any of those temperatures is low.

8. The control system for a hybrid vehicle as claimed in claim 6, wherein the first threshold is increased, with an increment of the vehicle speed, to be higher than that of a case in which the vehicle speed is low.

9. The control system for a hybrid vehicle as claimed in claim 6, wherein the drive force restriction means lowers the allowable limit of drive force, if any of the temperatures of the motor, the controller, the transaxle estimated from the temperatures of the motor and the controller is high, to be lower than that of a case in which any of those temperatures is low.

10. A control system for a hybrid vehicle having an internal combustion engine and two motors to which electric power is supplied from a battery, that is configured to select a drive mode from a mode where the vehicle is powered by the engine, and a mode where the vehicle is powered by at least one of the motors while stopping the engine, comprising:
    an electronic control unit (ECU) configured to:
    determine whether a state of charge of the battery is lower than a first threshold during propulsion of the vehicle by the two motors by supplying the electric power from the battery while stopping the engine; and
    restrict a total drive force of said two motors for propelling the vehicle to an allowable limit which is lower than a theoretical maximum drive force of said two motors when the state of charge of the battery is lower than the first threshold.

11. The control system for a hybrid vehicle as claimed in claim 10, wherein the ECU is configured to alter the allowable limit of the drive force to be lower than a theoretical maximum drive force of one of the motors.

12. The control system for a hybrid vehicle as claimed in claim 10, wherein the ECU is configured to lower the allowable limit of drive force in accordance with a reduction in the state of charge of the battery.

13. The control system for a hybrid vehicle as claimed in claim 12, wherein the ECU is configured to lower the allowable limit of drive force, with an increment of vehicle speed, to be lower than that of a case in which the vehicle speed is low.

14. The control system for a hybrid vehicle as claimed in claim 10, wherein the first threshold is set to be higher value than a second threshold for determining start-up of the engine and is altered depending on a detection value representing a running condition of the vehicle.

15. The control system for a hybrid vehicle as claimed in claim 14, further comprising:
    a transaxle that holds the motors and delivers the power of the engine toward drive wheels; and
    a controller configured to control the motors,
    wherein the detection value includes at least one of a temperature of the motor, a temperature of the controller, a temperature of the transaxle estimated from the temperatures of the motor and the controller, and a vehicle speed.

16. The control system for a hybrid vehicle as claimed in claim 15, wherein the first threshold is increased, if any of the temperatures of the motor, the controller, the transaxle estimated from the temperatures of the motor and the controller is high, to be higher than that of a case in which any of those temperatures is low.

17. The control system for a hybrid vehicle as claimed in claim 15, wherein the first threshold is increased, with an increment of the vehicle speed, to be higher than that of a case in which the vehicle speed is low.

18. The control system for a hybrid vehicle as claimed in claim 15, wherein the ECU is configured to lower the allowable limit of drive force, if any of the temperatures of the motor, the controller, the transaxle estimated from the temperatures of the motor and the controller is high, to be lower than that of a case in which any of those temperatures is low.

\* \* \* \* \*